000
United States Patent
Devall

(10) Patent No.: US 7,568,494 B2
(45) Date of Patent: Aug. 4, 2009

(54) ELECTRONIC FUEL TANK FILL LIMIT CONTROL

(75) Inventor: Jeffrey E. Devall, Greenup, IL (US)

(73) Assignee: Stant Manufacturing Inc., Connersville, IN (US)

( * ) Notice: Subject to any disclaimer, the term of this patent is extended or adjusted under 35 U.S.C. 154(b) by 254 days.

(21) Appl. No.: 11/277,745

(22) Filed: Mar. 28, 2006

(65) Prior Publication Data

US 2006/0231138 A1 Oct. 19, 2006

Related U.S. Application Data

(60) Provisional application No. 60/666,102, filed on Mar. 29, 2005.

(51) Int. Cl.
F16K 24/02 (2006.01)

(52) U.S. Cl. ........................ 137/202; 137/203

(58) Field of Classification Search .............. 137/202, 137/203, 38, 39, 43, 2; 220/86.2, DIG. 33; 123/518, 519, 516, 520
See application file for complete search history.

(56) References Cited

U.S. PATENT DOCUMENTS

| | | | |
|---|---|---|---|
| 4,753,262 A | 6/1988 | Bergsma | |
| 5,535,772 A | 7/1996 | Roetker et al. | |
| 5,566,705 A | 10/1996 | Harris | |
| 6,199,574 B1 | 3/2001 | Harris | |
| 6,302,137 B1 | 10/2001 | Devall | |
| 6,386,222 B1 | 5/2002 | Harris | |
| 6,439,258 B1 | 8/2002 | Decapua | |
| 6,578,597 B2 | 6/2003 | Groom et al. | |
| 6,658,933 B2* | 12/2003 | Allegre et al. ............. | 73/293 |
| 6,701,950 B2 | 3/2004 | Brock et al. | |
| 6,779,544 B2 | 8/2004 | Devall | |
| 2002/0121301 A1* | 9/2002 | Devall ....................... | 137/202 |

\* cited by examiner

Primary Examiner—Stephen M Hepperle
Assistant Examiner—Craig M Schneider
(74) Attorney, Agent, or Firm—Barnes & Thornburg LLP

(57) ABSTRACT

A vent apparatus is opened to allow free flow of fuel vapor from a vehicle fuel tank through the vent apparatus to a fuel vapor recovery canister during tank refueling until a predetermined level of liquid fuel is reached in the vent apparatus. Once refueling has been completed, the vent apparatus is closed to block or limit further flow of liquid fuel to the vent apparatus. At the same time, fuel vapor discharge passageways in the vent apparatus that had been closed once the fuel tank had been filled to a predetermined capacity with liquid fuel are reopened so that fuel vapor can flow freely from the fuel tank to the canister even though the volume or height of liquid fuel in the fuel tank has not decreased since the tank was filled during refueling.

20 Claims, 7 Drawing Sheets

ELECTRONIC FUEL TANK FILL LIMIT CONTROL

This application claims priority under 35 U.S.C. § 119(e) to U.S. Provisional Application Ser. No. 60/666,102, filed Mar. 29, 2005, which is expressly incorporated by reference herein.

BACKGROUND

The present disclosure relates to fuel tank vent valves, and particularly to venting apparatus which operates to seal the vapor space in the interior of a fuel tank at the completion of vehicle refueling and reopens at some point after refueling has been completed to vent the vapor space. More particularly, the present disclosure relates to a fill-limit valve system for controlling tank ventilation and for preventing overfilling of a vehicle fuel tank and for controlling flow of fuel vapor and liquid fuel through an aperture in a fuel tank.

Fuel-dispensing pump nozzles are known to include a fill-limiting sensor for shutting off the flow of fuel from the nozzle when a vehicle fuel tank is nearly filled. Typically, this fill-limiting sensor is triggered whenever the fuel tank is full and fuel "backs up" the tank filler neck to splash onto or reach the fill-limiting sensor located on the nozzle. Sometimes fuel pump operators overfill a fuel tank inadvertently in a good-faith effort to fill the tank "completely" or to purchase a quantity of fuel that can be paid for in cash without causing the operator to receive unwanted coinage in change.

During cornering, the liquid fuel inside a vehicle fuel tank is often agitated to cause the liquid fuel to move with a splashing motion inside the vehicle fuel tank. Liquid fuel can also be sloshed about in a vehicle fuel tank in response to other types of vehicle motion in addition to vehicle cornering.

Vehicle fuel tanks include vent apparatus for regulating discharge of liquid fuel and fuel vapor from the interior region of the fuel tank. Such a vent apparatus is often mounted in an aperture formed in a top wall of the vehicle fuel tank and could be exposed to rising levels of liquid fuel in the fuel tank during refueling and/or to agitated liquid fuel that is sloshed about inside the vehicle fuel tank during cornering or other movement of the vehicle. This type of vent apparatus often includes a buoyant "float valve" that is movable in a fuel tank to open and close a fuel tank venting outlet and that is capable of floating in liquid fuel once the liquid fuel rises to a certain level in the fuel tank. During tank refueling and sometimes during fuel sloshing, float valves are moved by liquid fuel to close tank venting outlets.

SUMMARY

According to the present disclosure, a vent apparatus is configured to allow free flow of fuel vapor from a vehicle fuel tank through the vent apparatus to a fuel vapor recovery canister during tank refueling. Once refueling has been completed, a signal is generated, for example, by the vehicle operator using an actuator, to reconfigure the vent apparatus to block or limit further flow of liquid fuel to the vent apparatus to minimize "liquid fuel carryover" to the canister. At the same time, fuel vapor discharge passageways in the vent apparatus that had been closed once the fuel tank had been filled to a predetermined capacity with liquid fuel are reopened by this signal so that fuel vapor can flow freely from the fuel tank to the canister even though the volume or height of liquid fuel in the fuel tank has not decreased since the tank was filled during refueling.

In illustrative embodiments, a normally open solenoid moves flow-control valves provided in the vent apparatus to allow free flow of fuel vapor through a fill-limit vent valve module to a canister during refueling but operates automatically after refueling is over to limit flow of liquid fuel through the fill-limit vent valve module when, for example, the engine ignition is activated. This prevents high velocity flow of liquid fuel with fuel vapor through the fill-limit vent valve module to block liquid fuel carryover to the canister after refueling is over and normal vehicle operation has resumed. A pump drains a liquid fuel reservoir in the module at vehicle engine ignition to cause the fill-limit vent valve in the module to reopen immediately and to allow venting of fuel vapor from the tank to the canister. In illustrative embodiments, the fill-limit vent valve is a buoyant valve configured to float on "rising" levels of liquid fuel in the module to close a tank venting passageway and on "falling" levels of liquid fuel in the module generated right away by module drainage caused by the pump to open the tank venting passageway.

Additional features of the present disclosure will become apparent to those skilled in the art upon consideration of the following detailed description of illustrative embodiments exemplifying the best mode of carrying out the invention as presently perceived.

BRIEF DESCRIPTION OF THE DRAWINGS

The detailed description particularly refers to the accompanying figures in which.

DETAILED DESCRIPTION OF THE DRAWINGS

Figure 1:
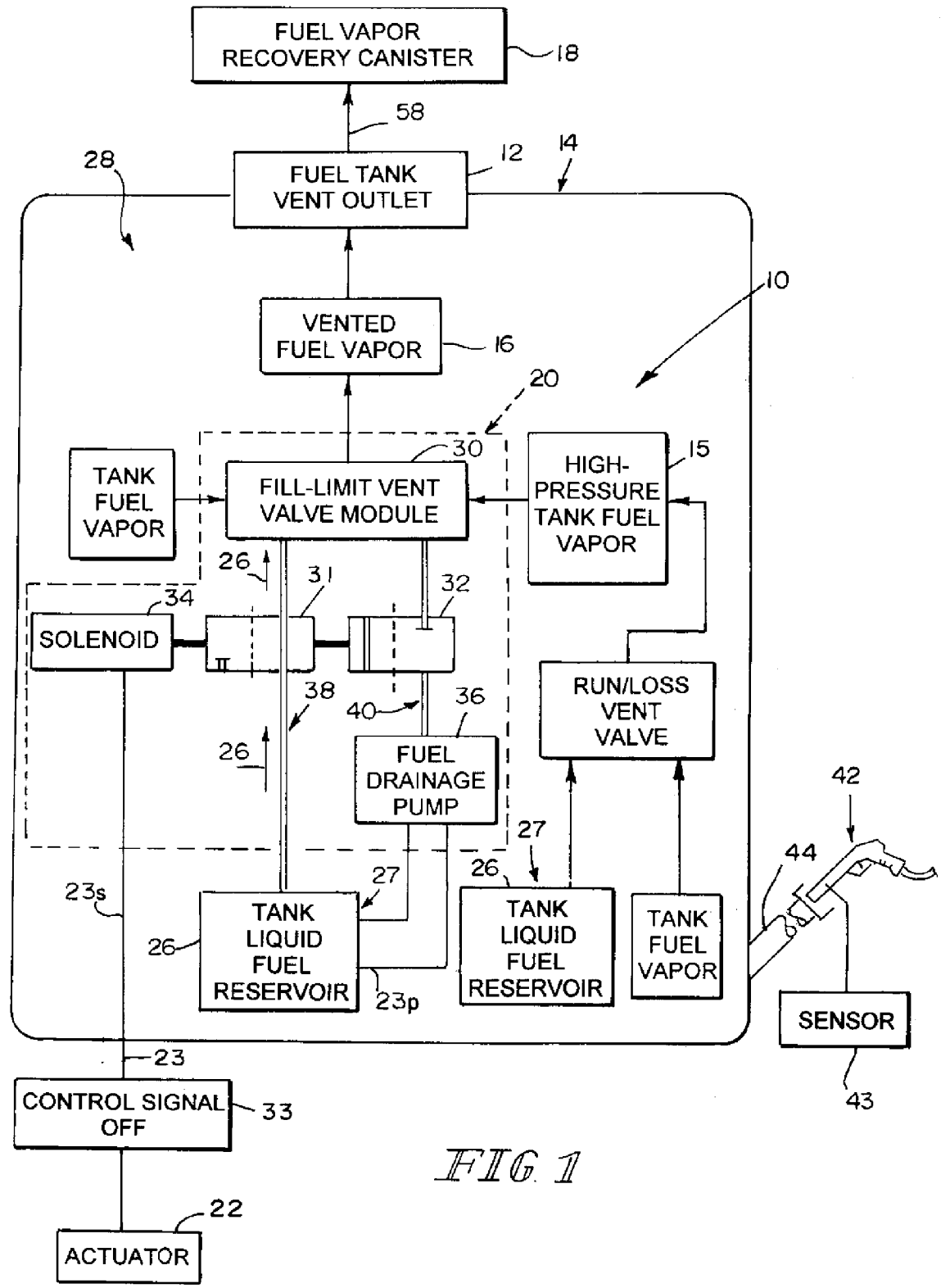
FIG. 1 is a block diagram of a vent apparatus located in a fuel tank to regulate discharge of fuel vapor and liquid fuel "carryover" from the tank to a destination outside of the tank showing a flow regulator (in phantom) comprising a fill-limit vent valve module, solenoid-controlled flow-control valves, and a fuel drainage pump and showing an actuator coupled to a solenoid to provide a control signal causing the flow-control valves associated with the solenoid to move to a "fuel-delivery" position during refueling of the fuel tank to deliver liquid fuel from the tank to the fill-limit vent valve module and disable the fuel drainage pump and also showing diagrammatically (1) discharge of tank fuel vapor from a vapor space in the tank to the fill-limit vent valve module and (2) discharge of "high-pressure" tank fuel vapor from the vapor space via a run/loss vent valve associated with the tank during certain high tank pressure conditions.
Figure 2:
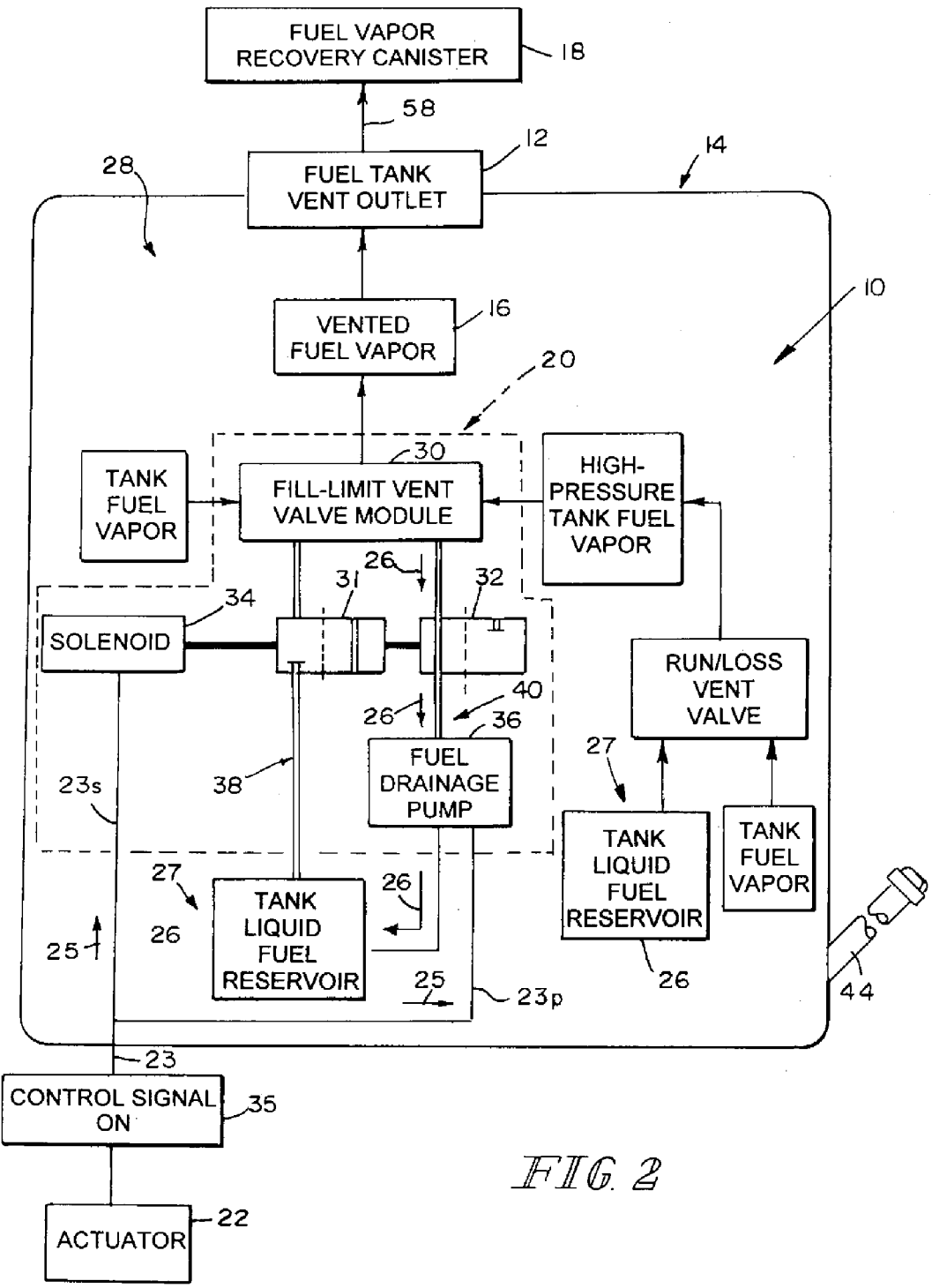
FIG. 2 is a block diagram similar to FIG. 1 showing that the solenoid has been actuated by the actuator once fuel tank refueling has ended to provide a control signal causing the flow-control valves associated with the solenoid to move to a "fuel-shutoff" position to (1) block further flow of liquid fuel from the fuel tank to the fill-limit vent valve module and (2) activate the fuel drainage pump to drain liquid fuel from the fill-limit vent valve module into the fuel tank so that liquid-fuel carryover to the fuel vapor recovery canister through the fill-limit vent valve module is minimized after fuel tank refueling has ended.
Figure 3A:
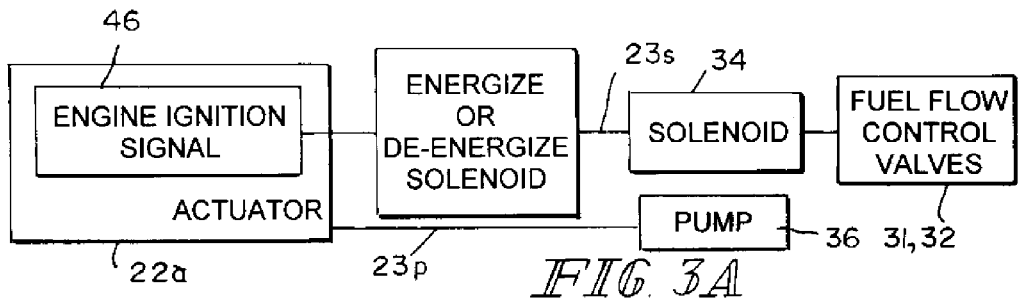
FIGS. 3A-3D show several options for configuring and using the actuator to control operation of the solenoid and the fuel drainage pump illustrated in FIGS. 1 and 2.
Figure 3B:
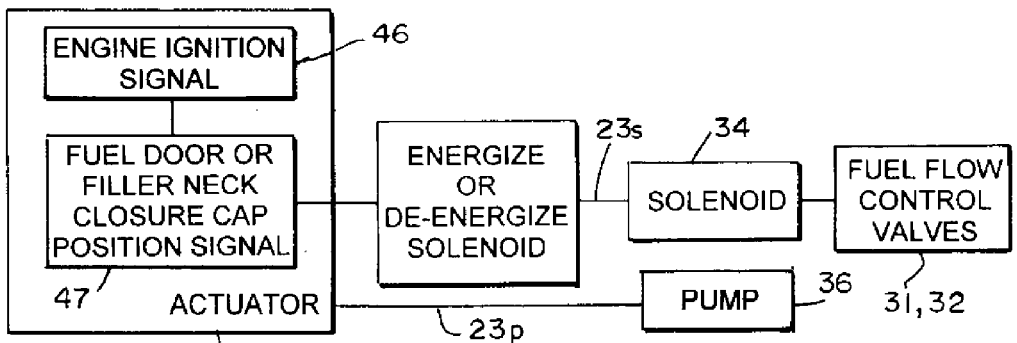
Figure 3C:
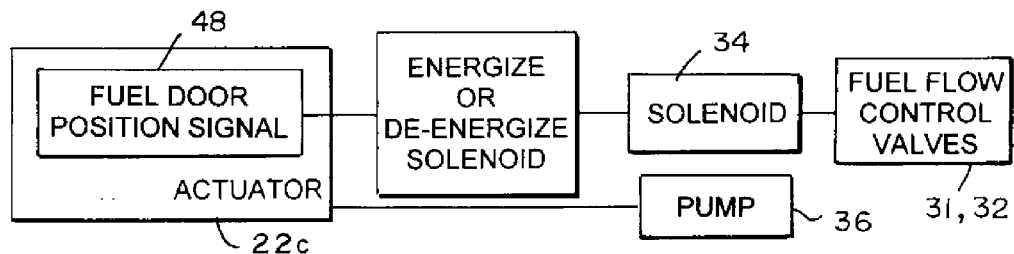
Figure 3D:
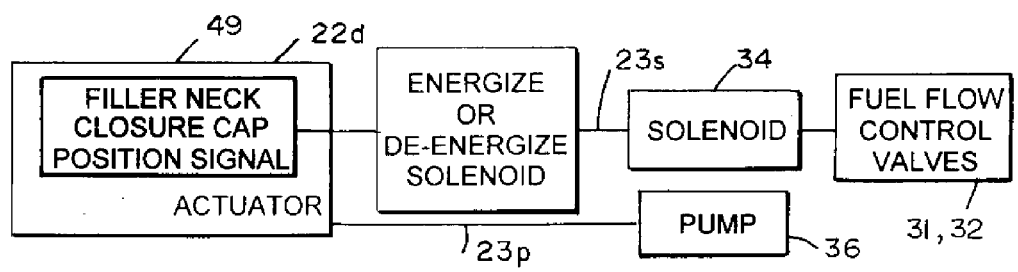
Figure 5:
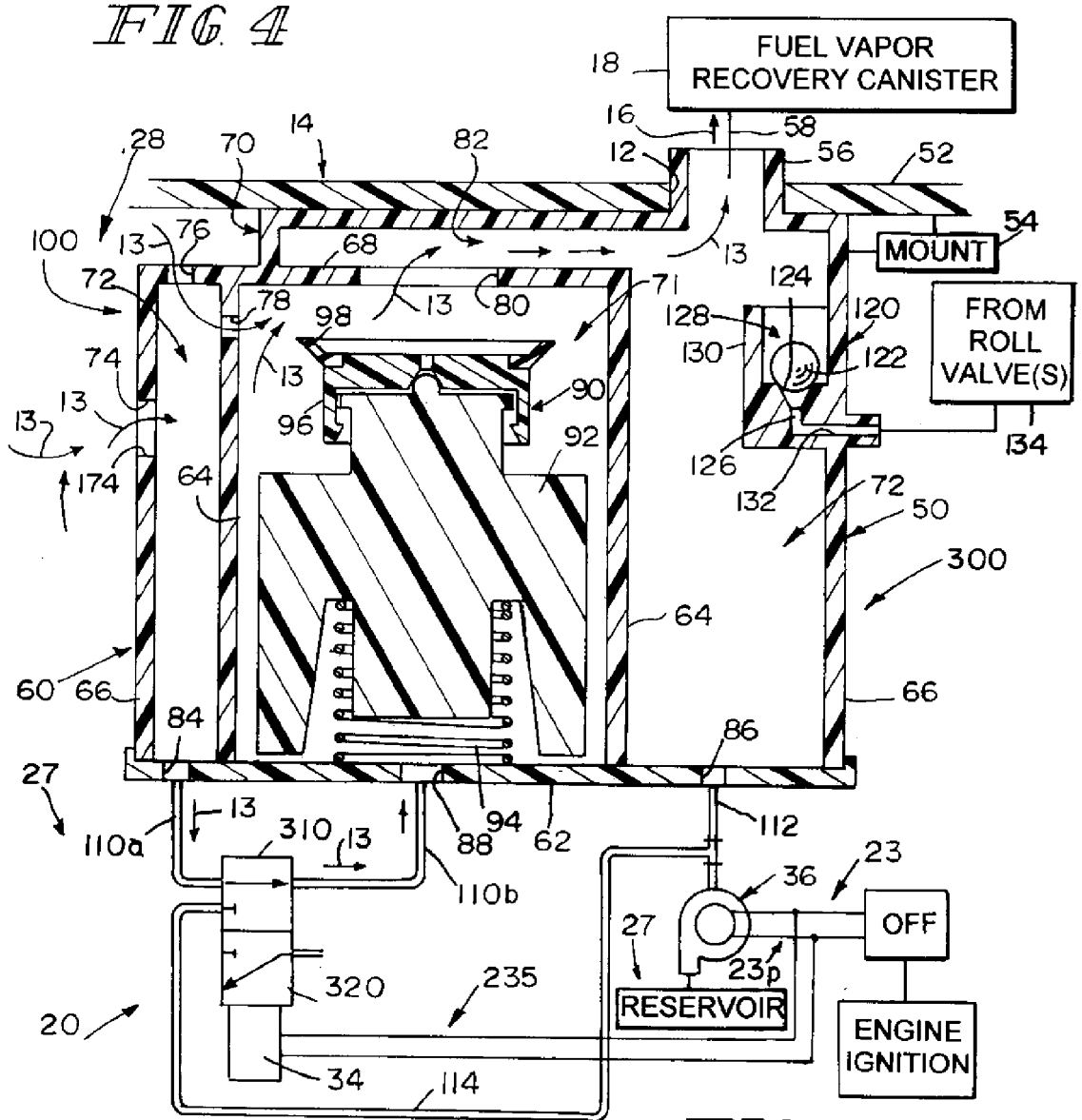
FIG. 5 is a sectional view of the fuel tank and vent apparatus of FIG. 4 during refueling showing that the engine ignition (i.e., actuator) is "off" to cause the flow-control valves associated with the solenoid to move to the fuel-delivery position and to disable the fuel drainage pump to prepare the fill-limit vent valve module to receive liquid fuel therein (see FIG. 7) as rising levels of liquid fuel in the fuel tank reach and "pour into" the fill-limit vent valve module and showing fuel vapor from the tank vapor space (generated by admission of liquid fuel into the tank during refueling) flowing past an "opened" float valve through a fuel tank vent outlet to a fuel vapor recovery canister.
Figure 6:
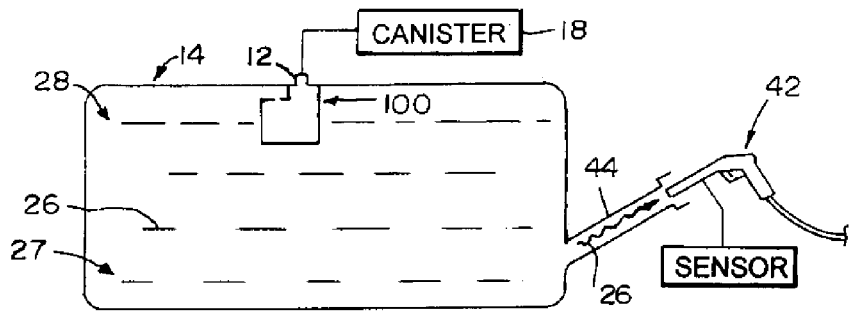
FIG. 6 is a diagrammatic view similar to FIG. 4 during a later stage of tank refueling showing exposure of the vent apparatus to liquid fuel once the tank has been filled to a predetermined maximum level during refueling and showing that liquid fuel in the fuel tank backs up through the tank filler neck to reach a fill-limiting sensor on a fuel-dispensing pump nozzle inserted into the tank filler neck to shut off further flow of liquid fuel from the pump nozzle into the tank.
Figure 7:
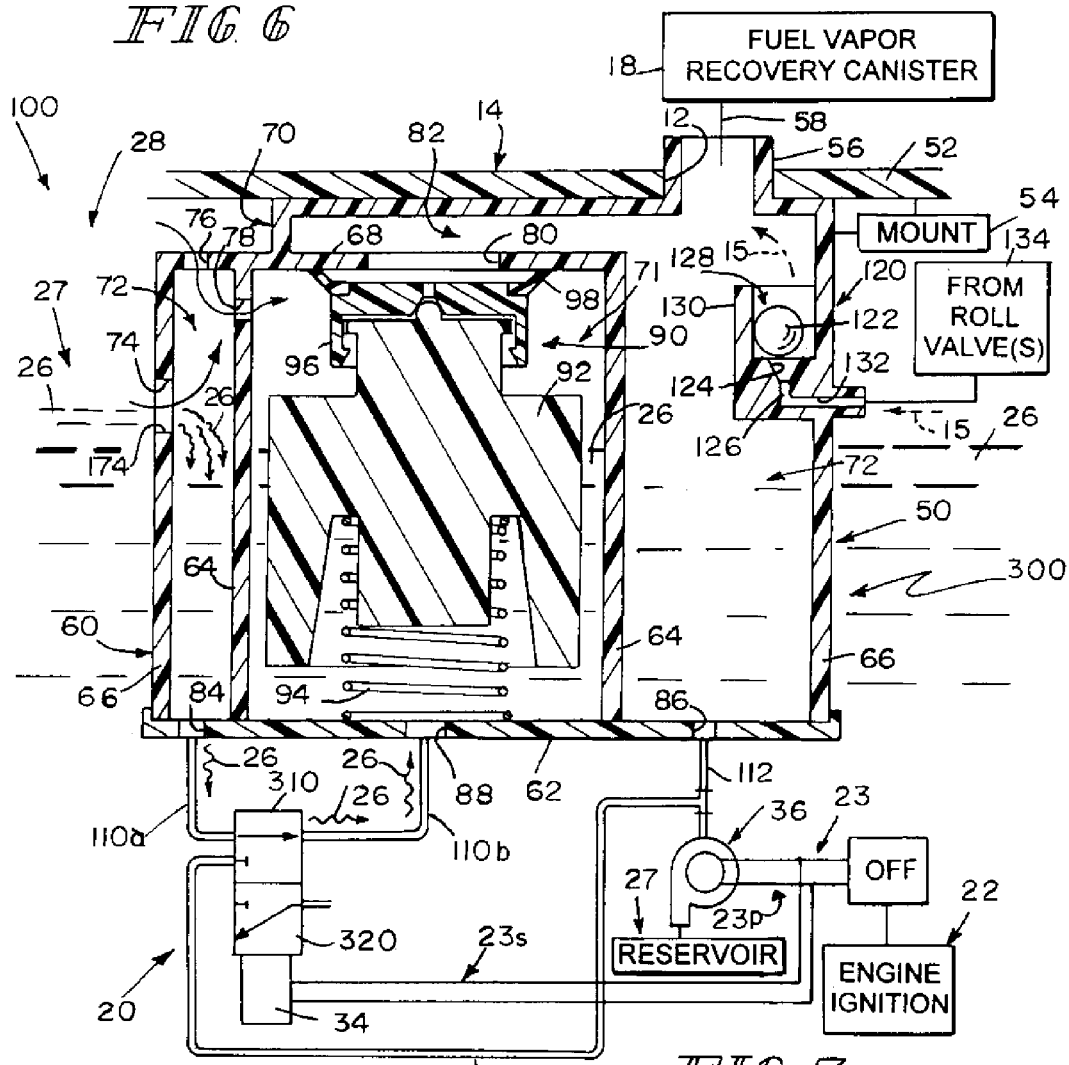
FIG. 7 is a sectional view similar to FIG. 5 showing flow of liquid fuel from the tank through an inlet into a fuel retention chamber formed in the fill-limit vent valve module and then through a liquid fuel supply passageway "opened" by the flow-control valves associated with the solenoid to fill a float chamber containing the float valve (while the fuel drainage pump is disabled) to cause the float valve to move upwardly in the float chamber to close an outlet orifice opening into the float chamber and communicating with the fuel tank vent outlet.
Figure 8:
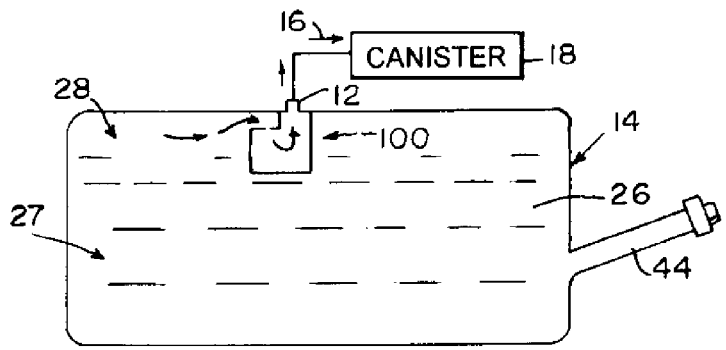
FIG. 8 is a diagrammatic view similar to FIGS. 4 and 6 once the tank has been filled to a predetermined capacity, tank refueling has been completed, and the engine started and showing that fuel vapor can be vented through the vent apparatus to the canister right away even though the level of liquid fuel in the tank has not dropped below the predetermined maximum level that was achieved during refueling and shown in FIGS. 6 and 7.
Figure 9:
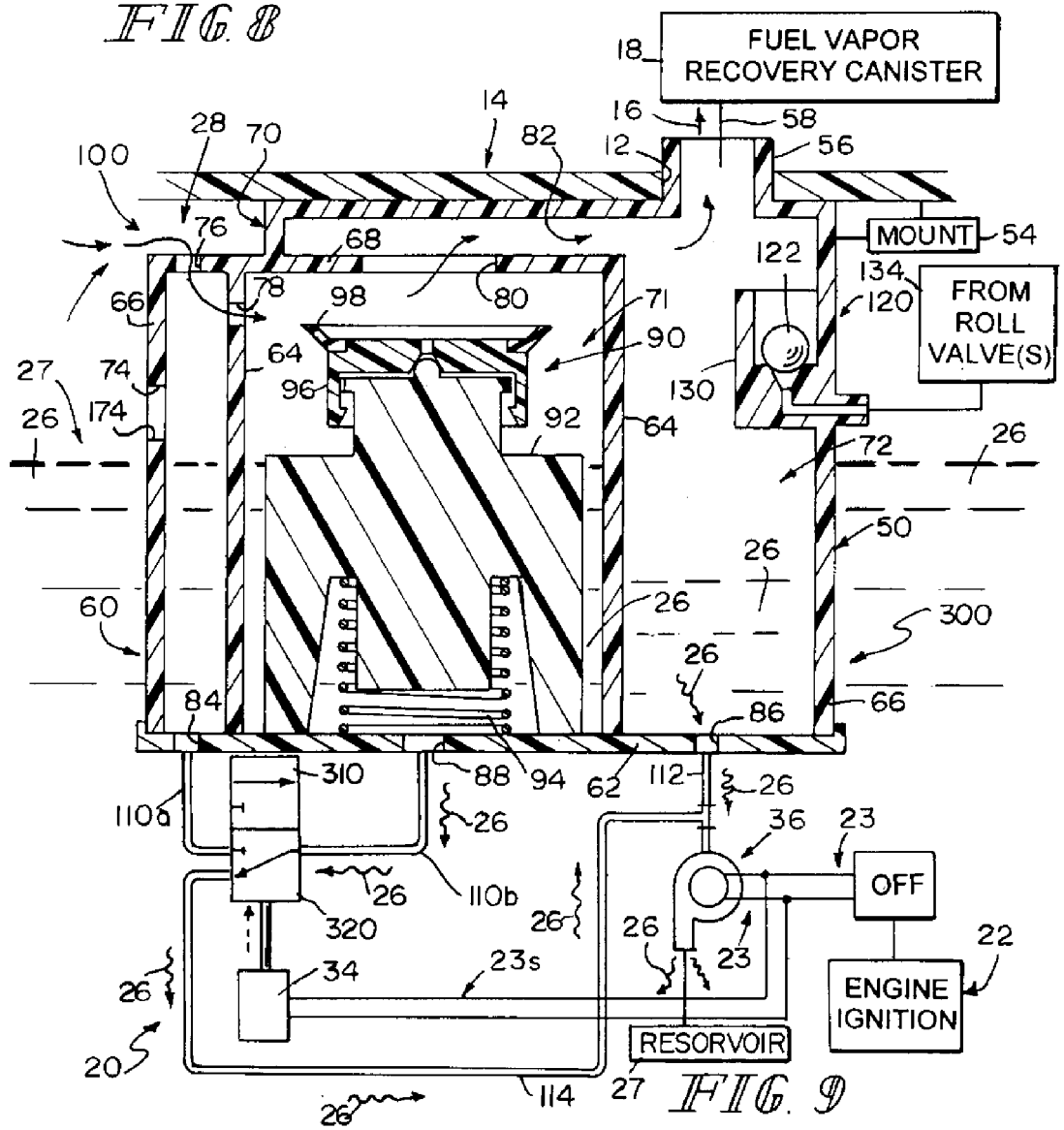
FIG. 9 is a sectional view similar to FIGS. 5 and 7 showing movement of the solenoid-controlled flow-control valves to the fuel-shutoff position and activation of the fuel drainage pump in response to signals provided by turning the engine ignition system "on" to drain liquid fuel from (1) the fuel retention chamber along a first path into the fuel tank and (2) the float chamber along a second path (through the flow-control valves associated with the solenoid) into the fuel tank so that the buoyant float valve can move downwardly in the float chamber on falling levels of liquid fuel in the float chamber to reopen the float chamber outlet orifice and allow fuel vapor from the fuel tank to vent through the fuel tank vent outlet to the canister, even though no fuel in the tank outside of the fill-limit vent valve module has been used and the level of liquid fuel in the tank has not fallen from the predetermined maximum level shown in FIGS. 6 and 7.

A vent apparatus 10 is coupled to a fuel tank vent outlet 12 formed in a fuel tank 14 and configured to discharge vented fuel vapor 16 from fuel tank 14 to a fuel vapor recovery canister 18 as suggested diagrammatically in FIGS. 1 and 2 and during certain fuel tank conditions as shown in FIGS. 5, 7, and 9. By providing a flow regulator 20 in vent apparatus 10 and operating flow regulator 20 using an actuator 22, as suggested in FIGS. 6 and 7, discharge of liquid fuel 26 entrained in vented fuel vapor 16 from vent apparatus 10 through fuel tank vent outlet 12 to fuel vapor recovery canister 18 during fuel tank refueling can be minimized. This will limit unwanted "liquid fuel carryover" from fuel tank 14 to fuel vapor recovery apparatus 18 and thus extend the operating life of fuel vapor recovery apparatus 18. As suggested in FIGS. 8 and 9, flow regulator 20 also can be operated using actuator 22 once fuel tank refueling has been completed, to block further flow of liquid fuel into a high-velocity fuel vapor flow path in vent apparatus and yet reopen fuel vapor vent passageways formed in vent apparatus 10 "without delay" so that relatively "dry" pressurized fuel vapor (i.e., free of liquid fuel) extant in a vapor space 28 provided in fuel tank 14 above liquid fuel 26 contained in fuel tank 14 is vented right away to fuel vapor recovery canister 18.

Flow regulator 20 comprises a fill-limit vent valve module 30, flow-control valves 31 and 32 coupled to solenoid 34, and a fuel drainage pump 36 as suggested diagrammatically in FIGS. 1 and 2. Flow regulator 20 also comprises means 38 (coupled to first flow-control valve 31) for conducting liquid fuel 26 to fill-limit vent valve module 30 under certain conditions as suggested in FIG. 1 and means 40 (coupled to second flow-control valve 32) for conducting liquid fuel 26 from fill-limit vent valve module 30 into a tank liquid fuel reservoir 27 stored in fuel tank 14 via fuel drainage pump 36 as suggested in FIG. 2.

Solenoid 30 is configured to move flow-control valves 31, 32 between a liquid fuel-delivery position shown in FIG. 1 and a liquid fuel-shutoff position shown in FIG. 2. Actuator 22 provides a control signal via signal lines 23, 23s to solenoid 34 to change the position of flow-control valves 31, 32.

In the liquid fuel-delivery position, first flow-control valve 31 is configured and arranged as suggested in FIG. 1 to allow flow of liquid fuel 26 through first flow-control valve 31 between fill-limit vent valve module 30 and tank liquid fuel reservoir 27 in fuel tank 14 during tank refueling when, for example, a fuel-dispensing pump nozzle 42 is dispensing liquid fuel 26 into fuel tank filler neck 44. Also in the liquid fuel-delivery position, second flow-control valve 32 is configured and arranged as suggested in FIG. 1 to block flow of liquid fuel 26 through second flow-control valve 32 and fuel drainage pump 36 between fill-limit vent valve module 30 and tank liquid fuel reservoir 27 in fuel tank 14 so that liquid fuel 26 can be retained in fill-limit vent valve module 30.

In the embodiment illustrated in FIG. 1, solenoid 34 moves flow-control valves 31, 32 to assume the liquid fuel-delivery position when an "off" control signal 33 is provided via signal lines 23, 23s to solenoid 34. At the same time, actuator 22 provides an "off" control signal 33 to fuel drainage pump 36 via signal lines 23, 23p to disable fuel drainage pump 36.

In the liquid fuel-shutoff position, first flow-control valve 31 is configured and arranged as suggested in FIG. 2 to block further flow of liquid fuel 26 from tank liquid fuel reservoir 27 in a high-velocity fuel vapor flow path provided in fill-limit vent valve module 30 after refueling of fuel tank 14 has been completed. Also in the liquid fuel-shutoff position, second flow-control valve 32 is configured and arranged as suggested in FIG. 2 to allow flow and drainage of liquid fuel 26 in fill-limit vent valve module 30 to tank liquid fuel reservoir 27 in fuel tank 14 so as to reopen without delay fuel vapor discharge passageways provided in module 30 (that had been closed once the level of liquid fuel 26 in fuel tank 14 had reached a predetermined capacity during refueling) so that vented fuel vapor 16 can be discharged from module 30 to fuel vapor recovery canister 18 right away.

In the embodiment illustrated in FIG. 2, solenoid 34 moves flow-control valves 31, 32 to assume the liquid fuel-shutoff position when an "on" control signal 35 is provided via signal lines 23, 23s to solenoid 34 by actuator 22. At the same time, the actuator provides an "on" control signal 35 to fuel drainage pump 36 via signal lines 23, 23p to activate pump 36 to drain liquid fuel 26 from fill-limit vent valve module 30 into reservoir 27 in fuel tank 14.

In operation, during tank refueling, solenoid 34 moves flow control valves 31, 32 to assume the liquid fuel-delivery position suggested in FIG. 1 so that a rising level of liquid fuel 26 in tank reservoir 27 is able to flow into fill-limit vent valve module 30 and move a float valve or other vent valve provided therein to a closed position substantially blocking flow of any fuel vapor in module 30 to canister 18. This causes fuel vapor pressure to increase in vapor space 28 of fuel tank 14 to displace liquid fuel 26 in tank liquid fuel reservoir 27 so that it flows into filler neck 44 toward an outer mouth of tank filler neck 44 to actuate a shutoff mechanism or sensor 43 provided on or associated with fuel-dispensing pump nozzle 42. This operation provided a fuel "fill limit" for fuel tank 14 so that the volume of liquid fuel 26 admitted into fuel tank 14 during tank refueling never exceeds a predetermined maximum volume and height defining the predetermined capacity of fuel tank 14.

However, once refueling has been completed, flow regulator 20 functions to "reopen" certain closed fuel vapor discharge passageways provided in fill-limit vent valve module 30 as soon as the "on" control signal 35 is provided to solenoid 34 and to fuel drainage pump 36. The "on" control signal 35 instructs solenoid 34 to move flow-control valves 31, 32 to move to assume the liquid fuel-shutoff position so that no more liquid fuel 26 and fast-moving fuel vapor is admitted into a high-velocity fuel vapor flow path provided in module 30. Liquid fuel carryover from module 30 to canister 18 via fuel tank vent outlet 12 is minimized by shutting of such flow. At the same time, the "on" control signal 35 turns on pump 36 to drain all liquid fuel 26 extant in module 30 into reservoir 27 in fuel tank 14, causing a float valve or other vent valve in module 30 to move away from a flow-blocking position to allow relatively dry vented fuel vapor 16 to pass from module 30 to canister 18 even though the volume or height of liquid fuel 26 extant in reservoir 27 of fuel tank 14 has not fallen.

Alternative configurations of actuators 22a-d are suggested in FIGS. 3A-D. Actuator 22a comprises an engine ignition signal 46 generated by movement of a switch (not shown) when an engine operator restarts an engine (not shown) after tank refueling has been completed. Engine ignition signal 46 could be used to energize or de-energize solenoid 34 to control position of first and second flow-control valves 31, 32, depending upon "logic" decisions made by a vent apparatus designer. Actuator 22b comprises a switch (not shown) for generating a fuel door or filler neck closure cap position signal 47 in series with another switch (not shown) for generating an engine ignition signal 46. For example, opening of the fuel door could be required before solenoid 34 is switched to move flow-control valves 31, 32 to the liquid fuel-delivery position. This would still require the engine operator to use a key to turn off the engine. This means one could not refuel fuel tank 14 with the engine running. Actuator 22c comprises only a switch (not shown) for generating a fuel door position signal 48 and actuator 22d comprises only a switch (not shown) for generating filler neck closure cap position signal 49.

One illustrative embodiment of vent apparatus 100 is shown in FIGS. 4-9. As suggested in FIG. 5, vent apparatus 100 comprises a fill-limit vent valve module 300, solenoid 34, flow-control valves 310, 320, and fuel drainage pump 36.

Fill-limit vent valve module 300 includes a housing 50 coupled to a top wall 52 (or other portion) of fuel tank 14 by a mount 54 to cause a venting outlet 56 provided on housing 50 to extend through a fuel tank vent outlet 12 formed, for example, in top wall 52 of fuel tank 14 as shown in FIG. 5. Venting outlet 56 is coupled to fuel vapor recovery canister 18 by a vent hose 58.

Module housing 50 includes a housing shell 60 coupled to mount 54 and a housing floor 62 coupled to housing shell 60 to close downwardly facing openings formed in housing shell 62 as shown, for example, in FIG. 5. Shell 60 and floor 62 are molded of a suitable plastics material in the illustrated embodiment.

As suggested in FIG. 5, shell 60 comprises an interior sleeve 64, an exterior sleeve 66 surrounding interior sleeve 64, a horizontal ceiling 68 coupled to interior and exterior sleeves 64, 66, and a vent member 70 arranged to overlie ceiling 68 and coupled to ceiling 68, exterior sleeve 66, and outlet 56. Interior sleeve 64, a portion of ceiling 68, and a portion of floor 62, cooperate to define a float chamber 71 inside housing 50. A fuel retention chamber 72 is defined between interior and exterior sleeves 64, 66, above a portion of floor 62, and below portions of ceiling 68 and vent member 70 as shown, for example, in FIG. 5.

As shown, for example, in FIG. 5, exterior shell 66 is formed to include a first inlet port 74 opening into fuel retention chamber 72 so that liquid fuel 26 can flow into fuel retention chamber 72 once the level of liquid fuel 26 in reservoir 27 rises to a high enough level in fuel tank 14 during refueling. Horizontal ceiling 68 is formed to include a second inlet port 76 opening into fuel retention chamber 72 to admit relatively dry fuel vapor 13 from vapor space 28 in fuel tank 14 into an upper region of fuel retention chamber 72 as suggested in FIGS. 5, 7, and 9. An upper inlet port 78 is formed in an upper portion of interior sleeve 64 near ceiling 68 to admit the relatively dry fuel vapor 13 extant in the upper region of fuel retention chamber 72 into an upper region of float chamber 71 as suggested in FIGS. 5, 7, and 9. Horizontal ceiling 68 is also formed to include an outlet orifice 80 to conduct fuel vapor 13 extant in float chamber 71 into a vapor discharge passageway 82 formed in vent member 70 and arranged to communicate with outlet 56 formed in housing 50 so that fuel vapor 13 discharged from float chamber 71 can flow through outlet 56 and vent hose 58 to canister 18 as suggested in FIG. 5.

Housing floor 62 is formed to include first and second outlet ports 84, 86 opening into fuel retention chamber 72 and an inlet/outlet flow port 88 opening into float chamber 71 as suggested, for example, in FIG. 5. Floor 62 is coupled to shell 60 using any suitable technique to align these ports 84, 86, 88 with their companion chambers 71, 72.

A fill-limit valve 90 is mounted for movement in float chamber 71 to control opening and closing of outlet orifice 80 formed in ceiling 68 as suggested, for example, in FIGS. 5, 7, and 9. It is within the scope of this disclosure to use a fill-limit valve comprising a vent valve and valve actuator as disclosed in U.S. Pat. No. 6,199,574, which disclosure is hereby incorporated by reference herein, in float chamber 71. In the illustrated embodiment, fill-limit valve 90 comprises a buoyant float 92, a float-biasing spring 94 acting between floor 62 and buoyant float 92, a vent valve 96 mounted for movement relative to the underlying buoyant float 92, and an annular seal 98 mounted on vent valve 96 and adapted to mate with an underside of ceiling 68 to establish a sealed connection therebetween and block flow between float chamber 71 and vapor discharge passageway 82. When float chamber 71 fills with liquid fuel 26, buoyant float 92 floats upwardly on that rising tide of liquid fuel 26 to move vent valve 96 and seal 98 upwardly to close outlet orifice 80 as shown, for example, in FIG. 7. When liquid fuel 26 is drained from float chamber 71, tank buoyant float 92 sinks and moves vent valve 96 and seal 98 away from ceiling 68 to reopen outlet orifice 80 as suggested in FIG. 9. Reference is made to U.S. Pat. Nos. 5,566,705 and 6,701,950 for disclosures relating to fill-limit valves, which disclosure is hereby incorporated by reference herein.

Several liquid fuel transfer passageways are coupled to housing 50, pump 36, and flow-control valves 310, 320 as suggested in FIG. 5. A liquid fuel supply passageway 110a, b is provided to conduct liquid fuel 26 discharged from fuel retention chamber 72 through inlet/outlet flow port 88 into float chamber 71 during refueling so that buoyant float 92 in float chamber 71 will be exposed to rising levels of liquid fuel 26 in float chamber 71 as fuel tank 14 is filled with liquid fuel 26. A liquid fuel drainage passageway 112 is provided to conduct liquid fuel 26 drained from fuel retention chamber 72 through second outlet port 86 to fuel drainage pump 36 for discharge into reservoir 27 in tank 14 when pump 36 has been activated after tank refueling has been completed. A bridge passageway 114 is provided to cooperate with a "downstream" portion 110b of the liquid fuel supply passageway to conduct liquid fuel 26 drained from float chamber 71 through inlet/outlet flow port 88 to fuel drainage pump 36 for discharge into reservoir 27 in tank 14 also when pump 36 has been activated after tank refueling has been completed.

Solenoid 34 is coupled to first and second flow-control valves 310, 320 as suggested in FIG. 5 using any suitable means. Alternatively, solenoid and flow-control valves 310, 320 may be an integral unit. Solenoid 34 can be operated using an "engine ignition" actuator 22 to move flow-control valves 310, 320 relative to liquid fuel supply passageway 110a, b and bridge passageway 114 between a "liquid fuel-delivery" position shown in FIGS. 5 and 7 and a "liquid fuel-shutoff" position shown in FIG. 9. In the liquid fuel-delivery position, liquid fuel 26 extant in fuel retention chamber 72 can flow into float chamber 71 through liquid fuel supply passageway 110. In the liquid fuel-shutoff position, pump 36 is activated to drain liquid fuel 26 from float chamber 71 to reservoir 27 via downstream passageway portion 110b and bridge passageway 114 and also from fuel retention chamber 72 to reservoir 27 via liquid fuel drainage passageway 112.

As shown in FIG. 5, a vent unit 120 is coupled to exterior sleeve 66 and located in fuel retention chamber 72 in a position near outlet 56. Vent unit 120 includes a movable head valve 122 normally at rest on a valve seat 124 formed to include a vent passageway 126 to close vent passageway 126. Head valve 122 remains in a valve chamber 128 defined by a cylinder-shaped wall 130 rising up from valve seat 124 as shown, for example, in FIG. 5. Vent unit 120 includes an inlet channel 132 formed in part in exterior sleeve 66 and communicating with vent passageway 126 so that pressurized fuel vapor 15 discharged from a rollover or run/loss valve 134 associated with fuel tank 14 is free to pass into an upper region fuel retention chamber 72 on its way to fuel vapor recovery canister 18 via outlet 56, fuel tank vent outlet 12, and vent hose 58 as suggested in FIG. 7.

Figure 4:
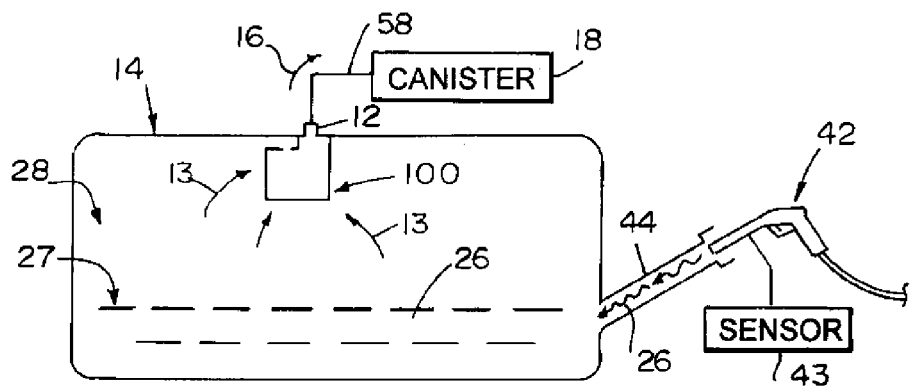
FIG. 4 is a diagrammatic view of a fuel tank and a vent apparatus in the fuel tank during an early stage of tank refueling when the level of liquid fuel in the fuel tank is still low.

Operation of vent apparatus 10 during a tank refueling cycle is illustrated, for example, in FIGS. 4-9. A nearly empty tank 14 is shown in FIGS. 4 and 5, closure of outlet orifice 80 by fill-limit vent valve 90, and resulting shutoff of fuel-dispensing pump nozzle 42 when fuel tank 14 is full is shown in FIGS. 6 and 7. Immediate drainage of float chamber 71 by pump 36 to cause fill-limit vent valve 90 to move downwardly away from ceiling 68 as soon as refueling has been completed to reopen outlet orifice 80 and allow relatively dry fuel vapor to vent from fuel tank 14 to canister 18 is shown in FIGS. 8 and 9.

During an initial stage of refueling, as suggested in FIGS. 4 and 5, tank fuel vapor 13 is able to flow freely from tank vapor space 28 to canister 18 through, for example, inlet ports 74, 76, fuel retention chamber 72, first outlet port 84, upstream fuel supply passageway 110a, first flow-control valve 310, downstream fuel supply passageway 110b, inlet/outlet flow port 88, float chamber 71, outlet orifice 80, fuel vapor discharge passageway 82, outlet 56, fuel tank vent outlet 12, and vent hose 58. Some fuel vapor 13 can also flow from fuel retention chamber 72 into float chamber 71 through port 78.

When liquid fuel 26 in fuel tank 14 rises to a level that is "high enough" to pour over a bottom edge 174 of first inlet port 74 (i.e., "shutoff window") into fuel retention chamber 72, as suggested, for example, in FIGS. 6 and 7, liquid fuel 26 fills fuel retention chamber 72 and flows into float chamber 71 through first outlet port 84, upstream fuel supply passageway 110a, first flow-control valve 310, downstream fuel supply passageway 110b, and inlet/outlet flow port 88. As float chamber 71 is filled with liquid fuel 26, buoyant float 92 rises on the rising level of liquid fuel 26 in float chamber 71 to move vent valve 96 and seal 98 upwardly to mate with an underside of ceiling 68 to close outlet orifice 80. This orifice closing action substantially blocks further discharge of fuel vapor 13 from fuel tank 14 to canister 18 and causes liquid fuel 26 in tank 14 to be displaced and "back up" filler neck 44 to reach sensor 43 and shutoff fuel-dispensing pump nozzle 42. This automatic shutoff action stops nozzle 42 from discharging more liquid fuel 26 into tank reservoir 27 through filler neck 44.

Once refueling of fuel tank 14 has ended, a vehicle operator manipulates actuator 22, which actuator is an engine ignition system in the embodiment illustrated in FIGS. 4-9. As the vehicle operator starts the engine to change actuator 22 to the "on" condition as suggested in FIG. 9, solenoid 34 is energized to shift flow-control valves 310, 320 to the liquid fuel-shutoff position. Such a shift "caps off" upstream fuel supply passageway 110a and "couples" downstream fuel supply passageway 110b in fluid communication to bridge passageway 114. Such a shift blocks fluid flow between upstream and downstream fuel supply passageways 110a, b and prevents any high-velocity flow of liquid fuel and fuel vapor through float chamber 71 and past fill-limit vent valve 90 toward canister 18. In this state, only a small "driving" vent orifice (i.e., upper port 78 in interior sleeve 64) provides the only flow path from fuel retention chamber 72 to float chamber 71 and on to canister 18. This orifice 78 is located at a very high elevation above the fuel tank floor, and because it is relatively small, it limits the velocity of fuel vapor flow into float chamber 71 and thus reduces chances of liquid fuel carryover into float chamber 71 and ultimately to canister 18.

At the same time that solenoid 34 is energized, a small "micro" electric motor (not shown) included in fuel drainage pump 36 is energized. The inlet of pump 36 is coupled to fuel retention chamber 72 (i.e., integrated liquid trap) by fuel drainage passageway 112 and also coupled to downstream fuel supply passageway 110b via second flow-control valve 320 as suggested in FIG. 9. Thus, pump 36 is energized to pump liquid fuel 26 from float chamber 71 so that liquid fuel 26 that was introduced into float chamber 71 at the end of the tank filling cycle can be pumped out and discharged back into reservoir 27 in fuel tank 14. This drainage allows the "two-stage" (or single stage) fill-limit vent valve 90 to reopen and allow venting of fuel vapor 13 to canister 18, even though no liquid fuel 26 outside fill-limit vent valve module 30 has been used. This provides for "zero-hysterisis" reopening. It will be understood that during normal driving of the vehicle (not shown) containing fuel tank 14, that any liquid fuel 26 that may slosh or otherwise be admitted into float chamber 71 or into fuel retention chamber 72 will also be pumped out and discharged back into reservoir 27 to minimize liquid fuel carryover to canister 18. All of the normal functions of a fill-limit vent valve are not changed or affected by addition of solenoid 34, flow-control valves 310, 320, and pump 36. This system allows for conversion of fill-limit vent valves and rollover valves to electrical operation.

By using electrical power onboard a vehicle in accordance with the present disclosure, liquid carryover to carbon canister 18 can be minimized. This system helps to reduce the amount of fuel vapor allowed to remain in a full fuel tank since the fill-limit vent valve does not close until the fuel level is very high and then reopens right away after tank refueling has been concluded without any fuel usage.

Figure 10:
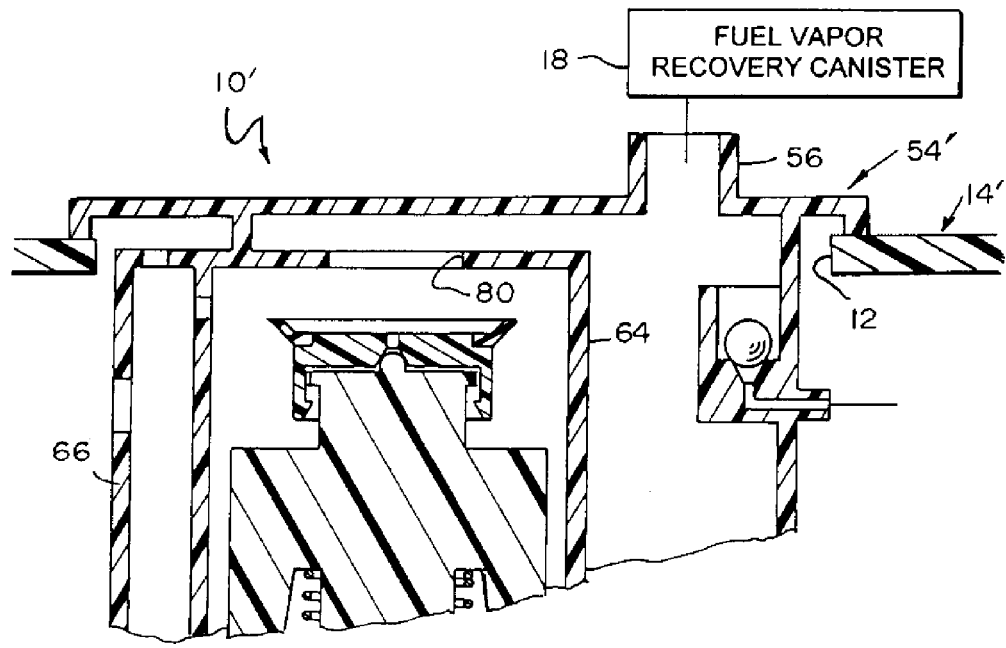
FIG. 10 is a partial sectional view similar to FIGS. 5, 7, and 9 showing one illustrative mount system for mounting the fill-limit vent valve module of FIGS. 5, 7, and 9 to a top wall of the fuel tank.

One embodiment of a mount 54' to couple module housing 50' to fuel tank 14' is shown in FIG. 10. In this embodiment, exterior sleeve 66 extends through a fuel tank vent outlet 12' formed in the top wall of fuel tank 14' and mount 54' is coupled to that top wall.

Figure 11:
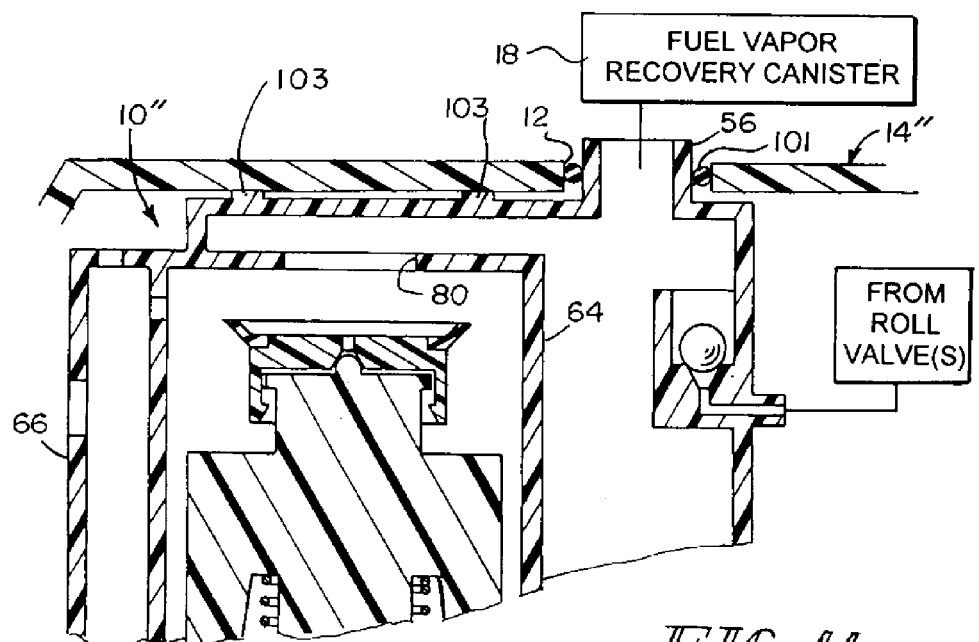
FIG. 11 is a partial sectional view similar to FIG. 10 showing another illustrative mount system for mounting the fill-limit vent valve module of FIGS. 5, 7, and 9 to the top wall of the fuel tank.

Another embodiment of a mount 54" to couple module housing 50" to fuel tank 14" is shown in FIG. 11. An annular seal 101 is interposed between a border edge defining fuel tank vent outlet 12 and outlet 56. Connectors 103 are used to couple vent member 70 to the underside of the top wall of fuel tank 14".

The invention claimed is:

1. A vent apparatus to be located in a fuel tank to regulate discharge of fuel vapor from the tank to a destination outside of the tank, the vent apparatus comprising
    a fill-limit vent valve adapted to be mounted in the tank and having a venting outlet adapted to be connected to a vent outlet of the tank and a flow port,
    the fill-limit vent valve being responsive to fuel level in the tank to open and allow venting of vapor in the fuel tank through the venting outlet until a predetermined liquid fuel level in the fill-limit vent valve is reached,
    a control valve connected to the flow port of the fill-limit vent valve and having a fuel port receiving fuel from the tank and a drain port draining fuel, and
    an actuator coupled to the control valve to provide a first control signal causing the control valve to move to a fuel-delivery position during refueling of the fuel tank to block the drain port and to open the fuel port to deliver liquid fuel from the tank to the fill-limit vent valve allowing discharge of tank fuel vapor from a vapor space in the tank to the fill-limit vent valve module until the fuel level closes the fill-limit vent valve, and to provide a second control signal after refueling causing the control valve to move to a fuel-shutoff position to block further flow of liquid fuel from the fuel tank to the fill-limit vent valve module and to open the drain port to drain liquid fuel from the fill-limit vent valve module into the fuel tank to allow the fill-limit vent valve to open.

2. The apparatus of claim 1, further comprising a fuel drainage pump connected to the drain port, and wherein the actuator provides a third control signal after refueling turning on the fuel drainage pump to drain liquid fuel from the fill-limit vent valve module.

3. The apparatus of claim 1, further comprising a vent unit connected to the venting outlet and having an inlet connected to one of a rollover valve and a run/loss valve, the vent value unit opening in response to pressure from one of the rollover valve and the run/loss valve.

4. The apparatus of claim 1, wherein the actuator is also responsive to the state of one of a fuel door and filler neck closure cap.

5. The apparatus of claim 1, wherein the fill-limit vent valve module includes a float chamber having an outlet connected to the venting outlet and having the flow port, a float valve in the float chamber to open and close the outlet of the float chamber, and a fuel retention chamber having an inlet port connected to the fuel tank and an outlet connected to the fuel port of the control valve.

6. The apparatus of claim 5, further comprising a vent orifice connecting the two chambers at a height above the maximum liquid fuel level to allow vapor flow between the chambers.

7. The apparatus of claim 6, wherein the fuel retention chamber includes a second inlet port at a height above the maximum liquid fuel level to allow vapor flow into fuel retention chamber.

8. The apparatus of claim 1, wherein the control valve is a solenoid-controlled valve and the actuator is responsive to a signal from an engine ignition.

9. The apparatus of claim 8, wherein the actuator is also responsive to the state of one of a fuel door and filler neck closure cap.

10. The apparatus of claim 8, wherein the actuator is also responsive to the state of at least one of an engine ignition, a fuel door and filler neck closure cap.

11. A vent apparatus to be located in a fuel tank to regulate discharge of fuel vapor from the tank to a destination outside of the tank, the vent apparatus comprising
    a fill-limit vent valve adapted to be mounted in the tank and having a venting outlet adapted to be connected to a vent outlet of the tank and a flow port,
    the fill-limit vent valve bring responsive to fuel level in the tank to open and allow venting of vapor in the fuel tank through the venting outlet until a predetermined liquid fuel level in the fill-limit vent valve is reached,
    a solenoid-controlled valve connected to the flow port of the fill-limit vent valve and having a fuel port receiving fuel from the tank and a drain port draining fuel,
    a pump connected to the drain port of the solenoid-controlled valve draining fuel when turned on, and
    an actuator coupled to the solenoid-controlled valve to provide a first control signal causing the solenoid-controlled valve to move to a fuel-delivery position during refueling of the fuel tank to block the drain port and to open the fuel port to deliver liquid fuel from the tank to the fill-limit vent valve allowing discharge of tank fuel vapor from a vapor space in the tank to the fill-limit vent valve module until the fuel level closes the fill-limit vent valve, to provide a second control signal after refueling causing the solenoid-controlled valve to move to a fuel-shutoff position to block further flow of liquid fuel from the fuel tank to the fill-limit vent valve module and to open the drain port to drain liquid fuel from the fill-limit vent valve module into the fuel tank to allow the fill-limit vent valve to open, and to provide a third control signal after refueling turning on the fuel drainage pump to drain liquid fuel from the fill-limit vent valve module.

12. The apparatus of claim 11, further comprising the fill-limit vent valve module includes a float chamber having an outlet connected to the venting outlet and having the flow port, a float valve in the float chamber to open and close the outlet of the float chamber, and a fuel retention chamber having an inlet port connected to the fuel tank and an outlet connected to the fuel port of the solenoid-controlled valve.

13. The apparatus of claim 12, including a vent orifice connecting the two chambers at a height above the maximum liquid fuel level to allow vapor flow between the chambers.

14. The apparatus of claim 13, wherein the fuel retention chamber includes a second inlet port at a height above the maximum liquid fuel level to allow vapor flow into fuel retention chamber.

15. A method of controlling a vent apparatus located in a fuel tank to regulate discharge of fuel vapor from the tank to a destination outside of the tank, the method comprising providing the vent apparatus having a control valve and a fill-limit vent valve, the control valve being connected to a flow port of the fill-limit vent valve and having a fuel port for receiving fuel from the tank and a drain port for draining fuel, and an actuator coupled to the control valve to provide signals to fill or drain the fill-limit vent valve, providing flow of liquid fuel to the vent apparatus during tank refueling to operate the vent apparatus allowing flow of fuel vapor from the fuel tank through the vent apparatus to the destination until a predetermined fluid level is reached in the vent apparatus which stops the flow of fuel vapors through the vent apparatus, determining that refueling has been completed, stopping the flow of liquid fuel to the vent apparatus during tank refueling after determining that refueling has been completed to block further flow of liquid fuel to the vent apparatus, and draining liquid fuel from the vent apparatus after determining that refueling has been completed to operate the vent apparatus allowing flow of fuel vapor from the fuel tank through the vent apparatus to the destination.

vapor from the fuel tank through the vent apparatus to the destination.

16. The method of claim 15, further comprising providing a pump connected to the venting apparatus and operating the pump to drain the liquid fuel from the vent apparatus.

17. The method of claim 15, wherein determining that refueling has been completed includes determining the state of at least one of an engine ignition, a fuel door, and filler neck closure cap.

18. The method of claim 15, further comprising the step of operating the control valve to provide and stop the flow of liquid fuel to the vent apparatus and to drain liquid fuel from the vent apparatus.

19. The method of claim 18, further comprising providing a pump connected to the control valve and operating the pump to drain the liquid fuel from the vent apparatus.

20. A fuel tank including the venting apparatus of claim 1.

* * * * *